United States Patent
Kim

(10) Patent No.: US 7,418,264 B2
(45) Date of Patent: Aug. 26, 2008

(54) PERFORMING HANDOVER BY DEFERRING IP ADDRESS ESTABLISHMENT

(75) Inventor: Yong-Ho Kim, Anyang (KR)

(73) Assignee: LG Electronics Inc., Seoul (KR)

( * ) Notice: Subject to any disclaimer, the term of this patent is extended or adjusted under 35 U.S.C. 154(b) by 566 days.

(21) Appl. No.: 11/124,310

(22) Filed: May 6, 2005

(65) Prior Publication Data

US 2005/0266848 A1   Dec. 1, 2005

Related U.S. Application Data

(60) Provisional application No. 60/577,186, filed on Jun. 7, 2004, provisional application No. 60/571,537, filed on May 17, 2004, provisional application No. 60/568,738, filed on May 7, 2004.

(30) Foreign Application Priority Data

Jun. 8, 2004   (KR) ..................... 10-2004-0041596
May 4, 2005   (KR) ..................... 10-2005-0037769

(51) Int. Cl.
*H04Q 7/20*   (2006.01)

(52) U.S. Cl. ................. 455/436; 455/437; 455/438; 370/329; 370/331; 709/238; 709/239

(58) Field of Classification Search ............. 455/432.1, 455/436, 437, 438, 443, 450, 509; 370/329, 370/331, 341, 395.3, 409, 431, 912; 709/227–228, 709/238–242
See application file for complete search history.

(56) References Cited

U.S. PATENT DOCUMENTS

| 6,590,880 | B1 |  | 7/2003 | Maenpaa et al. |
| 2002/0114293 | A1 |  | 8/2002 | Madour et al. |
| 2002/0118656 | A1 | * | 8/2002 | Agrawal et al. ............. 370/329 |
| 2005/0025164 | A1 | * | 2/2005 | Kavanagh et al. ........... 370/401 |
| 2005/0130660 | A1 | * | 6/2005 | Park et al. ................... 455/436 |
| 2005/0213539 | A1 | * | 9/2005 | Dutta et al. ................. 370/331 |

* cited by examiner

*Primary Examiner*—William Trost
*Assistant Examiner*—James D Ewart
(74) *Attorney, Agent, or Firm*—Lee, Hong, Degerman, Kang & Schmadeka

(57) ABSTRACT

In a broadband wireless access system, when handover is performed while receiving data, a method of deferring IP address establishment procedures is provided to allow such data to be delivered between the base stations. When the terminal receiving downlink data moves from a first base station region to a second base station region, the first base station delivers the downlink data to the second base station, and the second base station uses a particular message to inform that there is data to be delivered to the terminal such that the IP address establishment of the terminal is deferred.

31 Claims, 13 Drawing Sheets

FIG. 5

| Syntax | Size | Notes |
|---|---|---|
| MOB-HO-IND_Message_Format () { | | |
| Management Message Type = 56 | 8 bits | |
| Reserved | 6 bits | Reserved; shall be set to zero |
| HO_IND_Type | 2 bits | 00: Serving BS release<br>01: HO cancel<br>10: HO reject<br>11: Serving BS release with data forwarding |
| Target_BS_ID | 48 bits | Applies only when HO-IND-type = 00 or 11 |
| HMAC Tuple | 21 bytes | |
| } | | |

FIG. 6

| Field | Size | Notes |
|---|---|---|
| Global Header | 152 bits | |
| Length | 8 bits | Length of MAC SDU that includes Global header, MSS unique identifier and Security field |
| MSS unique identifier | 48 bits | Identifier used by MSS during initial network entry |
| MAC SDU | Variable | |
| Security field | TBD | A means to authenticate this message |

FIG. 7

| Field | Size | Notes |
|---|---|---|
| Global header | 152 bits | |
| MSS unique identifier | 48 bits | A unique identifier used by MSS on initial network entry |
| Action | TBD | TBD |
| Security field | TBD | A means to authenticate this message |

FIG. 8

| Type | Length | Value | Scope |
|---|---|---|---|
| 5.23 | 1 | Bit #0: DHCP-default<br>Bit #1: Mobile IPv4<br>Bit #2: Forwarded Data Exists<br>Bit #3-7: reserved; shall be set to zero | REG_REQ<br>REG_RSP |

FIG. 9

| Name | Type | Length | Value |
|---|---|---|---|
| Forwarded Data Indication | XX | 1 | Forwarding Data Exists |

FIG. 11A

| Syntax | Size | Notes |
|---|---|---|
| MOB_FWD_IND_Message_Format () { | | |
| Management Message Type =?? | 8 bits | |
| Action code | 2 bits | 00: Data forwarding supported<br>01: Data forwarding not supported<br>10: reserved<br>11: reserved |
| Reserved | 6 bits | |
| } | | |

FIG. 11B

| Name | Type (1 byte) | Length | Value (Variable-length) |
|---|---|---|---|
| Service Level Prediction | 17 | 1 | This value indicates the level of service the MSS can expect from this BS. The following encodings apply:<br>0= No service possible for this MSS.<br>1= Some service is available for one or several Service Flows authorized for the MSS.<br>2= For each authorized Service Flow, a MAC connection can be established with QoS specified by the Authorized QoSParamSet.<br>3= No service level prediction available. |
| Global Service Class Name | nn | 6 | |
| QoS Parameters | [145/146]. Variable | Variable | Compound TLV incorporating one or more 11.13 QoS Parameter Set definition encodings |
| SFID | [145/146].1 | 4 | |
| Resource Retain Flag | 20 | 1 | This value indicates whether the former Serving BS retains the connection information of the MSS<br>0= the connection information for MSS is deleted<br>1= the connection information for MSS is retained |
| HO Process Optimization | nn | 1 | For each Bit location, a value of '0' indicates that the associated re-entry management messages shall be required, a value of '1' indicates that the re-entry management message may be omitted. Regardless of the HO Process Optimization TLV settings, the Target BS may send unsolicited SBC-RSP and/or REG-RSP management messages.<br>Bit #0: Omit SBC-REQ/RSP management messages during current re-entry processing.<br>Bit #1: Omit PKM-REQ/RSP management messages during current re-entry processing.<br>Bit #2: Omit REG-RSP/RSP management messages during current re-entry processing.<br>Bit #3: Omit Network Address Acquisition management messages during current re-entry processing.<br>Bit #4: Omit Time of Day Acquisition management messages during current re-entry processing.<br>Bit #5: Omit TFTP management messages during current re-entry processing.<br>Bit #6: Full service and operational state transfer or sharing between Serving BS and Target BS (ARQ, timers, counters, MAC state machines, etc.)<br>Bit #7: post-HO re-entry MSS DL data pending at Target BS. |

PERFORMING HANDOVER BY DEFERRING IP ADDRESS ESTABLISHMENT

CROSS REFERENCE TO RELATED APPLICATIONS

The present application claims the benefit of Korean patent application number 10-2004-041596 filed Jun. 8, 2004, Korean patent application number 10-2005-037769 filed May 4, 2005, the disclosure of which is incorporated herein by reference, and the benefit of U.S. provisional application No. 60/571,537 filed May 17, 2004, U.S. provisional application No. 60/577,186 filed Jun. 7, 2004, and U.S. provisional application No. 60/568,738 filed May 7, 2004, the disclosures of which are incorporated herein by reference.

BACKGROUND ART

The present invention relates to a method of maintaining data service continuity in broadband (wideband) wireless (radio) access systems, in particular, to a method of establishing IP addresses of a mobile station for maintaining data service continuity during handover or in idle mode.

In general, in a broadband wireless (radio) access system, an idle mode for a mobile (or fixed) terminal (e.g., mobile station, mobile subscriber station (MSS), user terminal, user equipment (UE), etc.) is supported in order to minimize power consumption. In idle mode, a 'paging zone' is defined as the entire region that is handled by a plurality of bases station called a 'paging group' and all base station included within the same paging zone have the same paging cycle value (Paging_Cycle) and paging offset value (Paging_Offset).

The terminal may request to the base station for changing into idle mode, and the base station delivers its paging zone identification (Paging-group ID) and the paging cycle and paging offset associated thereto to the terminal to allow that terminal to change into idle mode state. During the idle mode, the terminal can determine whether to maintain or end its idle mode based upon the paging that is delivered in broadcast format from the base station at each paging period.

Additionally, when there is traffic (e.g., data, packets, etc.) that needs to be delivered by the terminal in idle mode, the terminal may end its idle mode at any time. Also, when a terminal in idle mode does not receive paging within a set period of time due to reasons such as moving into another paging zone, losing synchronization, etc., then the terminal ends its idle mode.

Hereafter, the procedures of a terminal transitioning into idle mode and a related art method of establishing an IP address when downlink data exists will be explained.

However in FIG. 1, a method of delivering downlink traffic (data) received by the terminal to a registered base station (BS), namely, from a previous base station (Serving BS) to a new base station (Target BS), is not defined in the related art. Also, even if a method of delivering data between base stations is defined, when the terminal re-establishes an IP address, the delivered data would be useless from the point of view of an application program in the terminal.

For example, in FIG. 1, if a terminal in idle mode moves into a paging zone and is within a zone of another base station BS#3, when downlink data arrives at the base station BS#1 that performed registration release for initially transitioning to the idle mode, the base station BS#3 informs the terminal to perform network entry through a paging message.

Then the data needs to be delivered from the base station BS#1 of which the terminal initially transitioned into idle mode to the base station BS#3 that currently received paging, but the related art does not define a method of such delivery.

Also, even if the above described problem is resolved, as shown in FIG. 2, in the related art, because the terminal performs IP address establishment (or re-establishment) upon receiving paging when there is downlink traffic (data), the received data is useless from the point of view of the terminal.

Accordingly, among the above-described operations in the related art, when there is traffic (data) that needs to be delivered to the terminal in idle mode, a method of receiving data without the terminal performing the IP establishment procedures is not defined.

Meanwhile, when performing handover in a broadband wireless access system, the terminal releases the connection with the base station that is in service (Serving BS), and performs handover to the targeted base station (Target BS) to which handover is to be made. When the terminal performs handover, a mobile terminal handover indicator (MOB_HO_IND) is delivered to the Serving BS, and if the handover indicator type (HO_IND_type) value is '00', this means that the Serving BS is released (Serving BS Release).

In the related art, if the handover indicator type (HO_IND_type) value is '00', Serving BS releases all connections and the state machine of the medium control layer (MAC) related to the terminal and the MAC PDUs (Protocol Data Units) can be ignored. Also, it is defined that the Serving BS can deliver the MAC state machine and MAC PDUs to the target base station (Target BS) for service continuity, or may be ignored by a request through a backbone message of the target base station. However, the particular operations that need to be performed for the terminal to receive such have not yet been specified.

Accordingly, the present invention defines the operations for receiving data delivered by the previous base station to the target base station after the terminal has moved.

FIGS. 3 and 4 depict two examples of performing handover by a mobile terminal. As shown in FIGS. 3 and 4, in the handover procedures according to a request of the terminal or a request of the base station, after the terminal performs initialization procedures for handover, a handover indicator (e.g., a MOB_HO_Indication) is transmitted to the base station (Serving BS) that is currently receiving service, and the relationship (connection) with the base station BS#1 receiving the service is released. Thereafter, the remaining procedures for accessing the target base station BS#3, namely, raging procedures and initial network entry, are performed by the terminal.

FIG. 5 depicts a format of a handover indicator (MOB_HO_Indication). When releasing the relationship (connection) with the base station BS#1 receiving service, the HO-IND-type is set as '00'.

However, as in the idle mode of the related art, if the serving base station delivers data to the target base station when the terminal performs handover, if the terminal that moved re-establishes the IP address during data reception, the received data become useless. Namely, as shown in FIG. 2, regardless of whether there is data being delivered after handover, the terminal immediately performs IP address establishment, and even if the delivered data is sent to the terminal, such data is useless from the point of view of the application program in the terminal. Thus, in such case, the time when IP address establishment should be performed needs to be clearly defined, but the related art fails to do so.

PURPOSE OF THE INVENTION

To address the related art problems, data continuity should be maintained when handover for a mobile terminal is performed (of when the terminal changes its operation mode), while IP address establishment also needs to be appropriately performed to ensure proper communications between the terminal and the network for a broadband (wideband) wireless (radio) access system.

SUMMARY OF THE INVENTION

In a broadband (wideband) wireless (radio) access system, when a mobile or fixed terminal in idle mode has downlink data to be received or when handover is performed while receiving such data, the IP address establishment procedures are deferred (delayed) to allow such data to be properly delivered between the base stations.

BRIEF DESCRIPTION OF THE DRAWINGS

FIG. 5 depicts a format of a handover indicator according to the related art.

FIG. 6 depicts a format of a data delivery message used in the present invention.

FIG. 7 depicts a format of a data transmission stop message used in the present invention.

FIG. 8 depicts an example of a registration response message used in the present invention.

FIG. 9 depicts an example of a ranging response message according to the present invention.

FIG. 11A depicts a format of a data delivery indicator used in the present invention.

FIG. 11B depicts an example of Registration Response (RNG_RSP) message encodings according to the present invention.

DETAILED DESCRIPTION

Figure 1:
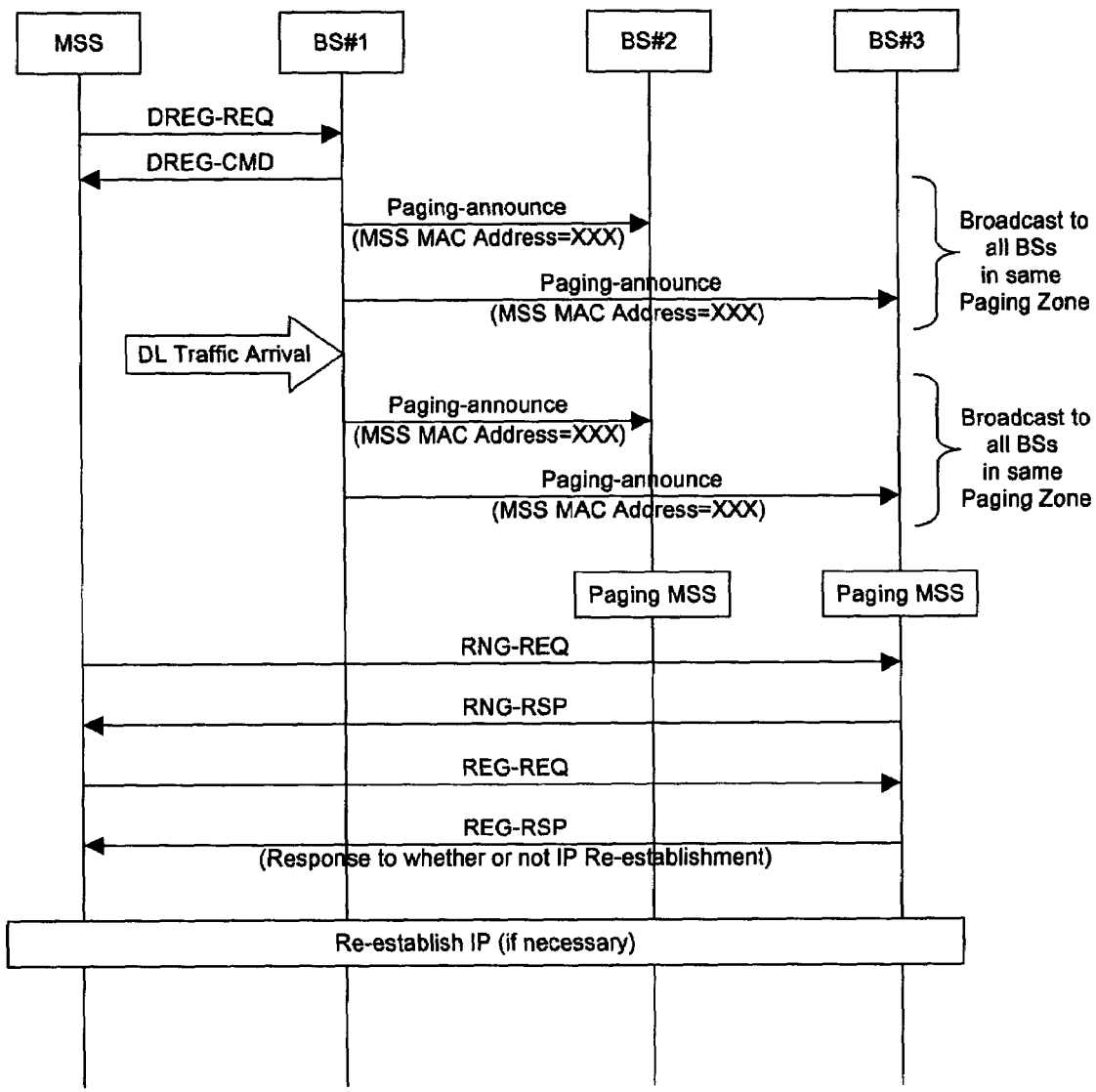
FIG. 1 depicts an IP address re-establishment operation when a mobile station transitions to idle mode according to the related art.

The preferred exemplary embodiments of the present invention will now be explained. However, those skilled in the art would understand that the features of the present invention should not be limited to only the embodiments described herein.

The present invention is related to the research and development being conducted by various IEEE working groups, such as IEEE 802.16, and thus the concepts and teachings involved therein are applicable to the features of the present invention. Additionally, as various efforts are being made to implement the interworking of different types of networks and communication technologies, such as achieving compatibility between IEEE networks and cellular networks (such as, a third generation (3G) networks), it can be clearly understood that the present invention may also have applicability in achieving such compatibility.

Considering the communication protocols related to wireless (radio) access systems, at the network layer, to allow proper data packet communication via the Internet, an Internet Protocol (IP) provides the necessary addressing and routing information for the packets. Here, each device (e.g., user terminal, mobile handset, wireless connectivity device, etc.) connected via the Internet requires the establishment of a unique IP address in order for that device to be properly identified and distinguished from other devices.

The Internet Protocols referred to as IP version 4 (IPv4) and IP version 6 (IPv6) have been developed. By employing 32-bit addresses, IPv4 has been found to have limitations because of the increasing popularity of Internet communications, whereby each device connected with the Internet needs its own unique IP address. As such, because the availability of 32-bit addresses would soon be exhausted, an enhancement was developed, namely, IPv6, which employs 128-bit addresses.

However, the fact that a user terminal may have mobility (e.g., mobile terminals) makes IP address establishment more difficult. For example, to support mobility, a user terminal may undergo handover, whereby the terminal being served by one base station that covers a certain region, moves to a new location and needs to be served by a different base station that covers that new location. In other words, the mobile station that is part of a first subnet (i.e., a portion of the network) moves into a second subnet (i.e., another portion of the network). Another example would be when a user terminal changes its state of operation into a receiving mode from an idle mode, which is an example of a power-saving operation mode that is important because a user terminal having mobility should conserve its limited battery power.

In such handover or idle mode change situations described above, IP address establishment must be performed at the appropriate time such that seamless data reception can be received by the user terminal.

To address the related art problems, in a broadband (wideband) wireless (radio) access system in which a mobile terminal in idle mode moves into a region of a second base station that is within a paging zone of a first base station, a method of establishing an IP address of the mobile terminal according to the present invention comprises: when downlink data arrives at the first base station, the first base station delivers the downlink data to the second base station through a first message; the second base station informs the mobile terminal through a second message that there is data to be delivered; and delaying IP address establishment in order to allow data reception at the mobile terminal according to the second message.

Preferably, the first message is a data delivery message. Preferably, the IP address establishment method of the terminal further comprises a step of transmitting a data transmission stop message by the first base station to the second base station after IP address establishment is complete. Preferably, the second message is a registration response message or a ranging response message. In this case, the registration response message includes a parameter that delays IP address establishment of the terminal by informing that data to be delivered exists.

To achieve the above-identified purpose, in a broadband wireless access system in which a mobile terminal receiving downlink data moves into a region of a second base station that is within a paging zone of a first base station, a method of establishing an IP address of the mobile terminal according to the present invention comprises: asking whether the first base station can deliver downlink data to the second base station, by delivering a handover indicator from the mobile terminal to the first base station; the first base station informs the mobile terminal as to whether data delivery is possible via a data delivery indicator, and delivers the downlink data to the second base station; and performing IP address re-establishment procedures after receiving the downlink data from the second base station upon receiving the data delivery indicator.

Preferably, if the first base station cannot explicitly inform about data delivery capability or if a data delivery indicator is not received within a certain amount of time, the mobile terminal performs initial network entry, waits for a certain amount of time for receiving downlink data arrival, and then performs IP address re-establishment procedures.

To achieve the above-identified purpose, in a broadband wireless access system in which a mobile terminal receiving downlink data moves into a region of a second base station that is within a paging zone of a first base station, a method of establishing an IP address of the mobile terminal according to the present invention comprises: delivering by the mobile terminal a delivery indicator to the first base station; delivering by the first base station downlink data to the second base station via the data delivery indicator; informing by the mobile terminal that there is data to be delivered by the second base station to the mobile terminal via a first message; and receiving the downlink data from the second base station after delaying IP address re-establishment for a certain amount of time according to the first message.

Preferably, the first message is a registration response message or a ranging response message.

In a broadband (wideband) wireless (radio) access system, as a first embodiment, the present invention proposes a method of delivering data between base stations when there is downlink data to be received by a fixed/mobile terminal in idle mode, and a method of deferring (or delaying) IP address establishment procedures when the mobile terminal changes to receiving mode for data reception.

Namely, the present invention defines the procedures for delivering data to a current base station after the data arrives at the base station that performs the initial idle mode transition procedures, when a mobile terminal transitions to idle mode and moves from a region of a base station that performed the transition procedures into a region of another base station. Also, if the IP address changes when the terminal receives the message delivered by the above procedure, such data would be useless and thus the present invention defines the procedures such that the IP address establishment procedures are not performed in the above situation.

In another embodiment, the present invention provides a method of delivering data between base stations when handover is performed during data reception and a method of deferring the IP address establishment procedure while data is received after the mobile terminal moves to a new location.

Namely, in a broadband wireless access system, the present invention provides a method in which, during handover of a mobile terminal, the base station currently in service (Serving BS) delivers the data being received by the mobile terminal to a target base station (Target BS) to which handover is to be made through a backbone network in order to guarantee service continuity after handover.

Also, the present invention provides a method that can delay (defer or postpone) the IP address establishment procedure while the mobile terminal receives data that was delivered to the new base station from a previous base station after performing handover.

Additionally, the present invention provides a method that allows a mobile terminal to perform handover by explicitly knowing whether the data currently being explicitly received may be received after moving, and defines the message delivered from the serving base station to a target base station.

Also, the present invention, when the mobile terminal completes handover, defines a message indicating that data delivery should be stopped because handover has been completed, which the target base station sends to the serving base station.

First, a method of delivering data between the base stations and delaying (deferring or postponing) the IP address allocation of the terminal according to the first embodiment of the present invention will be explained as follows.

When handover is performed, the serving BS may discard MAC SDUs (service data units) associated with the MSS or forward the MAC SDUs for service continuation. However, the MSS should decide whether or not the MAC SDUs will be forwarded to the target BS depending on the traffic type. Thus, the present invention proposes a new method for MSS to request the serving MS release with data forwarding. To achieve this, the present invention proposes that the MOB-HO-IND message format be modified by adding one HO_IND_type for the MSS to decide on service continuation by forwarding MAC SDUs associated with the MSS, as shown in FIG. 5.

In case of data forwarding, if the MSS re-establishes IP connectivity after handover, the forwarded data become useless due to the IP address change. Therefore, the MSS should defer IP re-establishment if there exists forwarded data from the serving BS.

If the BS decides whether or not to forward the data and the MSS does not know of this decision, the MSS requests Serving BS release by sending a MOB_HO_IND MAC Management message with the HO_IND_type value indicating serving BS release and the BS decides whether or not to forward the data for the MSS to the target BS.

Because the MSS does not know whether the serving BS decides to forward the MSS's data to the target BS, the MSS waits for any forwarded data for some pre-defined time after handover. If data is received from the new BS within the pre-defined time and the destination is an old IP address, the MSS may choose to defer the IP address re-establishment until the session ends. If the MSS chooses to finish the session, it establishes IP connectivity to acquire a new IP address.

The new BS may send a Stop_Data_Forwarding backbone message to the old BS when the MSS re-established IP connectivity. When the serving BS receives the Stop_Data_Forwarding backbone message, the BS may close all connections and discard state machines and MAC SDUs associated with the MSS.

If the MSS can request the serving BS release with data forwarding explicitly, the MSS does not need to wait for a pre-defined time to check whether there is any forwarded data to be received after handover. In this case, the BS indicates the MSS with its capability of data forwarding. If the MSS receives an indication that data forwarding is supported, the MSS defers re-establishment of IP connectivity, and if the MSS receives an indication that data forwarding is not supported, the MSS re-establishes the IP connectivity without waiting for a pre-defined time after handover.

The new BS may send a Stop_Data_Forwarding backbone message to the old BS when the MSS re-established IP connectivity. When the serving BS receives the Stop_Data_Forwarding message, the BS may close all connections and discard state machines and MAC SDUs associated with the MSS.

If the MSS, which can request data forwarding explicitly, requests the serving BS release by sending a MOB_HO_IND MAC Mangement message with the HO_IND_type value indicating serving BS release, the MSS does not care whether the data is forwarded to the target BS or not. This MSS initiates IP re-establishment as soon as handover is finished and registers with the new BS.

After the handover request/response handshake has completed, the MSS may begin the actual handover (HO). At some stage during the HO process, the MSS terminates service with the serving BS with or without the option of data forwarding. This is accomplished by sending a MOB-HO-IND MAC Management message with the HO_IND_type value indicating serving BS release for without data forwarding or with the HO_IND_type value indicating serving BS release with data forwarding for forwarding data to the target BS.

If the HO_IND_type field specifies Serving BS release, the BS may close all connections and discard MAC state machines and the MAC PDUs associated with the MSS, and if the HO_IND_type field specifies Serving BS release with data forwarding, it may retain the connections, the MAC state machine, and the MAC PDUs associated with the MSS to be forwarded to the Target BS for service continuation until the Target BS requests for the Serving BS to stop forwarding over a backbone. The Target BS may buffer the forwarded data and deliver to the MSS when the MSS's handover is successfully finished, and at that time, send s backbone message to tell the Serving BS to stop forwarding.

The MSS may request the forwarding of currently receiving data by sending a MOB_HO_IND MAC Management message with the HO_IND_type value indicating serving BS release with data forwarding. This request is made if the MSS wants to receive the currently receiving data through the serving BS for service continuation and IP re-establishment is deferred after handover until the currently receiving data procedure finishes. Upon reception of the HO_IND_type of serving BS release with data forwarding, the serving BS shall send MOB_FWD_IND to the MSS on the basic CID indicating whether the BS can forward the data or not. If the action code in MOB_FWD_IND indicates 'data forwarding not supported', the MSS re-establishes the IP address as soon as handover is complete, and if the action code indicates 'data forwarding supported', then the MSS defers IP re-establishment and receives the forwarded data. When the MSS re-establishes IP connectivity during the receiving of forwarded data, the BS may send a backbone message to request the old BS to stop forwarding data.

In the first embodiment of the present invention, the following messages are defined:

Data delivery message: A message used by the serving base station when delivering the received data when the mobile terminal does not move to the target base station.

Data delivery stop message: A message sent by the target base station to the previous base station for requesting the stopping of data transmission by the mobile terminal.

Registration response message: A message that additionally includes a parameter to defer (delay or postpones) IP address establishment by informing that there is a message (data) to be delivered to the mobile terminal, when the mobile terminal performs registration procedures.

Ranging response message: A message that additionally includes a parameter to defer IP address establishment by informing that there is a message to be delivered to the mobile terminal, when the mobile terminal performs ranging procedures.

FIGS. 6 through 9 respectively depict examples of the above-described four types of messages, and the parameters used for each message are only examples and thus may be changed accordingly.

Here, the data delivery message shown in FIG. 6 may also be referred to as a "MSS-Data-Forwarding Message," which is a message sent from the Serving BS to the Target BS to forward the MMS's MAC SDUs during HO. This message is typically used when the MSS requests the Serving BS to release the Serving ZBS with data forwarding. Preferably, the transmission of this message shall be stopped upon reception of a Stop-Data-Forwarding message, explained below.

The data delivery stop message shown in FIG. 7 may also be referred to as a "Stop-Data-Forwarding Message," which is a message sent from the Target BS to the Serving BS in order to make the Serving BS stop forwarding the MSS's MAC SDUs.

Figure 10:
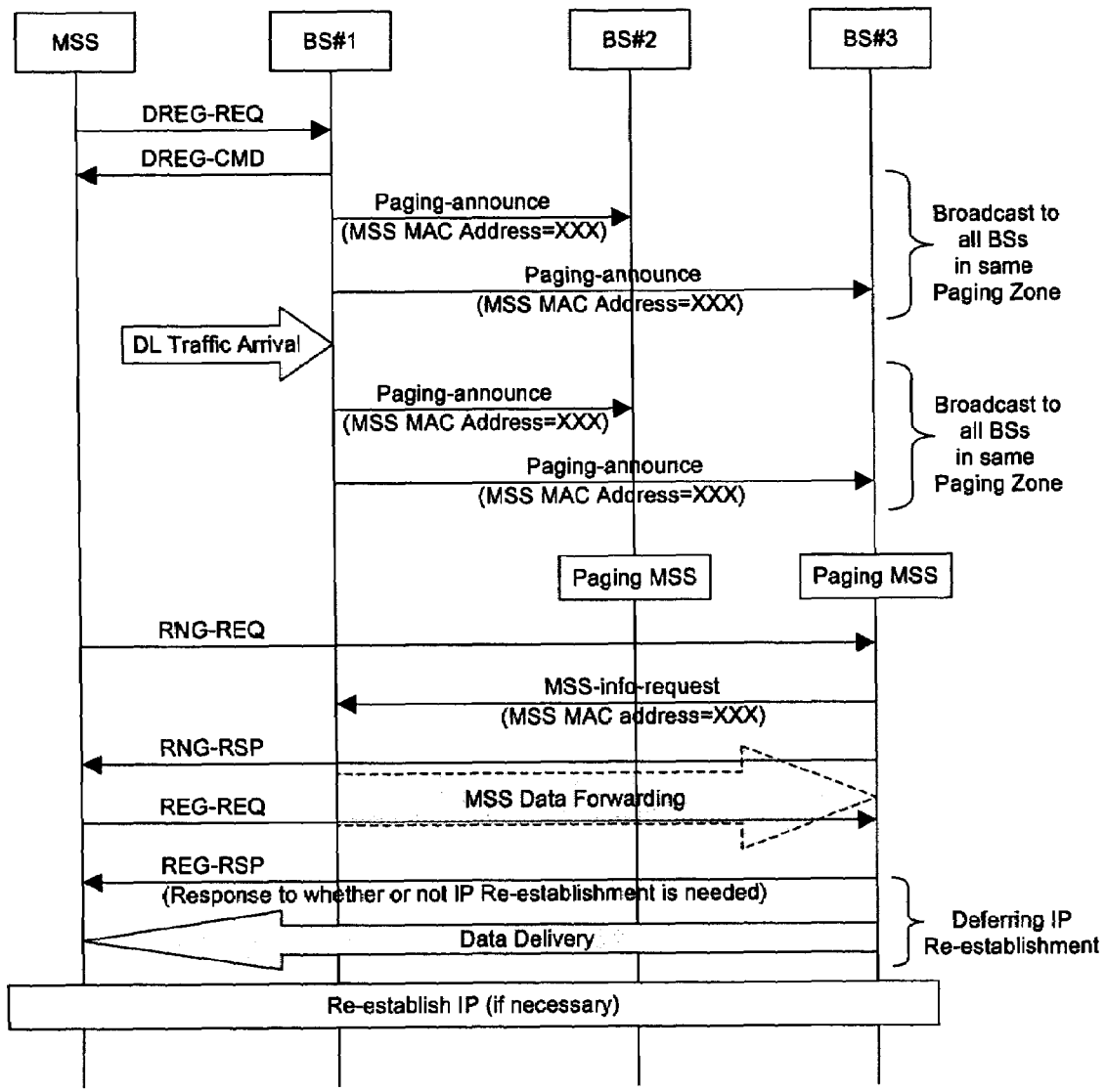
FIG. 10 depicts a method of delivering data between base stations and delaying IP address allocation of a mobile station according to a first embodiment of the present invention.

Hereafter, with reference to FIG. 10, a method of data delivery between base stations and delaying (deferring or postponing) IP address allocation (establishment) of the terminal according to the first embodiment will be explained.

Procedures for Delivering Data Between Base Stations

If the mobile terminal transitions to idle mode, and the mobile terminal moves from a base station region at which the mobile terminal performed the idle mode transition procedures into a different base station region, when data arrives at the base station (Serving BS: BS#1) that performed the initial idle mode transition procedures, this base station (BS#1) informs the other base stations (BS#2 and BS#3) that downlink data arrived at a mobile terminal (MSS) having a particular MAC (medium access control) address.

Then, all base stations (BS#2 and BS#3) within the same paging zone establishes an action code to an enter network by using a MAC address for paging the mobile terminals. The mobile terminals (MSS) receiving the paging perform network entry procedures, and the base station (Target BS: BS#3) with which this network entry procedure is performed, informs that a mobile terminal paging to its paging zone exists to the base station (Serving BS) that receives the above data.

Accordingly, the base station (BS#1) delivers the data to the base station (BS#3) that had a mobile terminal perform network entry. Here, the data is delivered by including it in a data delivery message, which is a backbone message.

Deferring IP Address Establishment When Performing Network Entry

When the mobile terminal performs network entry because it has data to be received, the mobile terminal must defer (delay or postpone) IP address establishment by the following two situations.

First, upon network entry according to an operation code (e.g., enter network) of paging, after being in idle mode, the IP address establishment is deferred (delayed or postponed).

Second, when the base station explicitly performs registration procedures or raging procedures, the fact that there is data to be delivered is informed to the mobile terminal through a registration response message or a ranging response message, and the mobile terminal defers (delays or postpones) IP address establishment.

Also, the mobile terminal can establish the IP address during data reception, and when the IP address is established, the base station that is receiving data transmits a data transmission stop message, which is a backbone message, to the base station that is delivering the data.

Thereafter, a method of delivering data between base stations and deferring (delaying or postponing) allocation (establishment) of the IP address of the mobile terminal according to the second embodiment of the present invention will now be explained as follows. The following messages are defined by the first embodiment of the present invention.

Handover indicator: This indicator requests explicit informing of whether or not delivery is possible for the data being currently received.

Data delivery indicator: This indicator allows the base station to inform the mobile terminal as to whether data delivery is possible.

Data delivery message: This message is used when the serving base station delivers to the target base station, the data that would have been received by the mobile terminal when it would not have moved.

Data transmission stop message: This message is used when the target base station request to the previous base station that the transmission of data of the mobile terminal should be stopped.

Registration response message: This message further includes a parameter that defers IP address establishment by informing that a message to be delivered to the mobile terminal exists, when the mobile terminal performs registration procedures.

Ranging response message: This message further includes a parameter that defers IP address establishment by informing that a message to be delivered to the mobile terminal exists, when the mobile terminal performs ranging procedures.

The formats of the handover indicator and the data delivery indicator are each depicted in FIGS. 5 and 11A, respectively. The formats of each of the above-identified four types of messages are depicted in FIGS. 6 through 9, respectively. Here, the parameters used for each message are only examples and thus may be changed accordingly.

In FIG. 11A, a MOB_FWD_IND_Message_Format is shown as an example of a data delivery indicator. The BS sends this message to indicate its data forwarding capability when an MSS sends a MOB_HO_IND MAC Management message witht the HO_IND_type value indicating serving BS release with data forwarding. Action code 00 is sent in order to indicate to MSS that the BS can forward data to the target BS, and 01 is sent when the BS cannot support data forwarding.

FIG. 11B depicts an example of Registration Response (RNG_RSP) message encodings according to the present invention.

Referring to FIG. 11B, during handover (HO), the Target BS may notify the MSS, through Bit#7, about a MSS downlink (DL) data pending element of the HO Process Optimization TLV item in the RNG-RSP, of post-HO re-entry MSS DL data pending. Upon MSS successful re-entry at the Target BS (which has now become the new Serving BS), and after the new Serving BS completes the reception of any HO pending MSS DL data retained and forwarded, the MSS may re-establish IP connectivity and the new Serving BS may send a backbone message to request the old Serving BS or other network entity to stop forwarding any pre-HO pending MSS DL data.

Hereafter, a method of delivering data between base stations and deferring (delaying or postponing) IP address allocation (establishment) of the mobile terminal according to the second embodiment will be explained with reference to FIGS. 12 through 15. Here, it should be noted that in FIGS. 12 through 15, the step of releasing the terminal (MSS) is depicted prior to the initial MMS data forwarding step. However, the box showing the "MMS release" step is depicted as dotted lines to indicate that the particular location of this step in the overall procedures may be changed as desired or if necessary. For example, the MSS release step may be performed near the end of the overall procedures instead of in the initial steps if doing so would be more advantageous.

Figure 12:
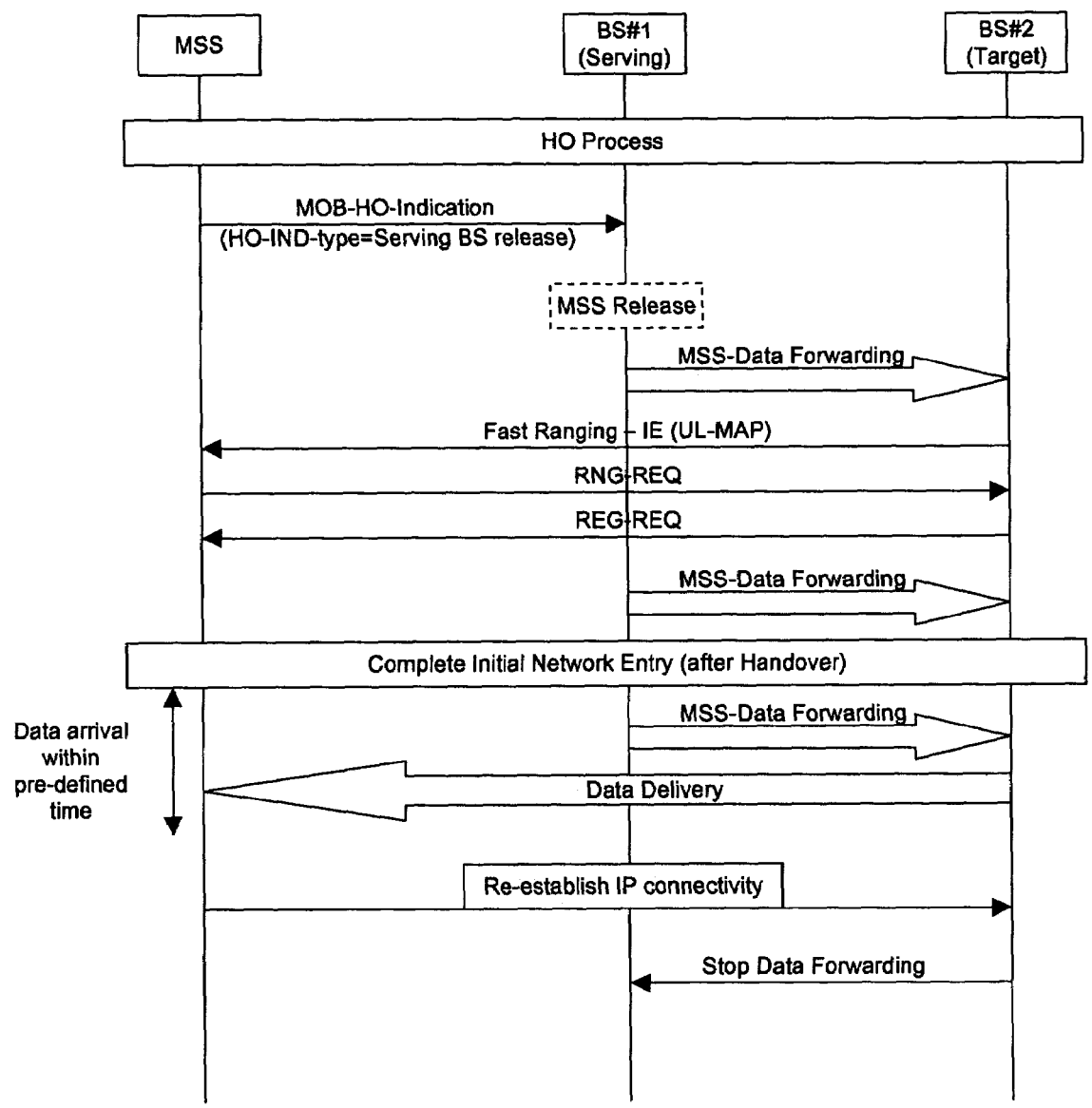
FIG. 12 depicts a method of delivering data between base stations and delaying IP address allocation of a mobile station according to a first embodiment of the present invention, showing IP address establishment when the base station cannot explicitly inform the mobile station about whether or not data delivery is possible.
Figure 13:
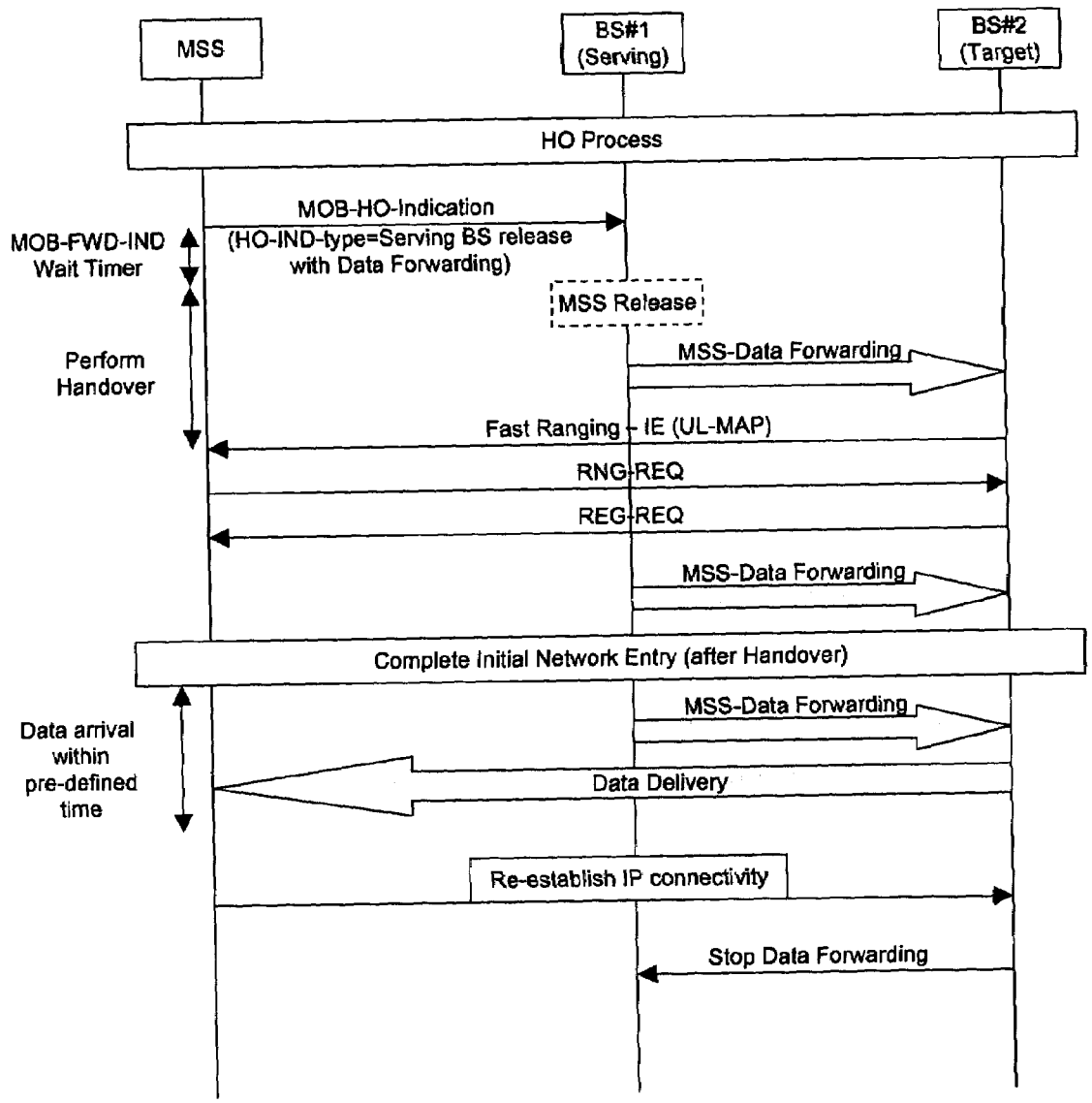
FIG. 13 depicts a method of the second embodiment of the present invention, wherein IP address establishment is performed when there is no distinct data delivery message from the base station during a certain amount of time.
Figure 14:
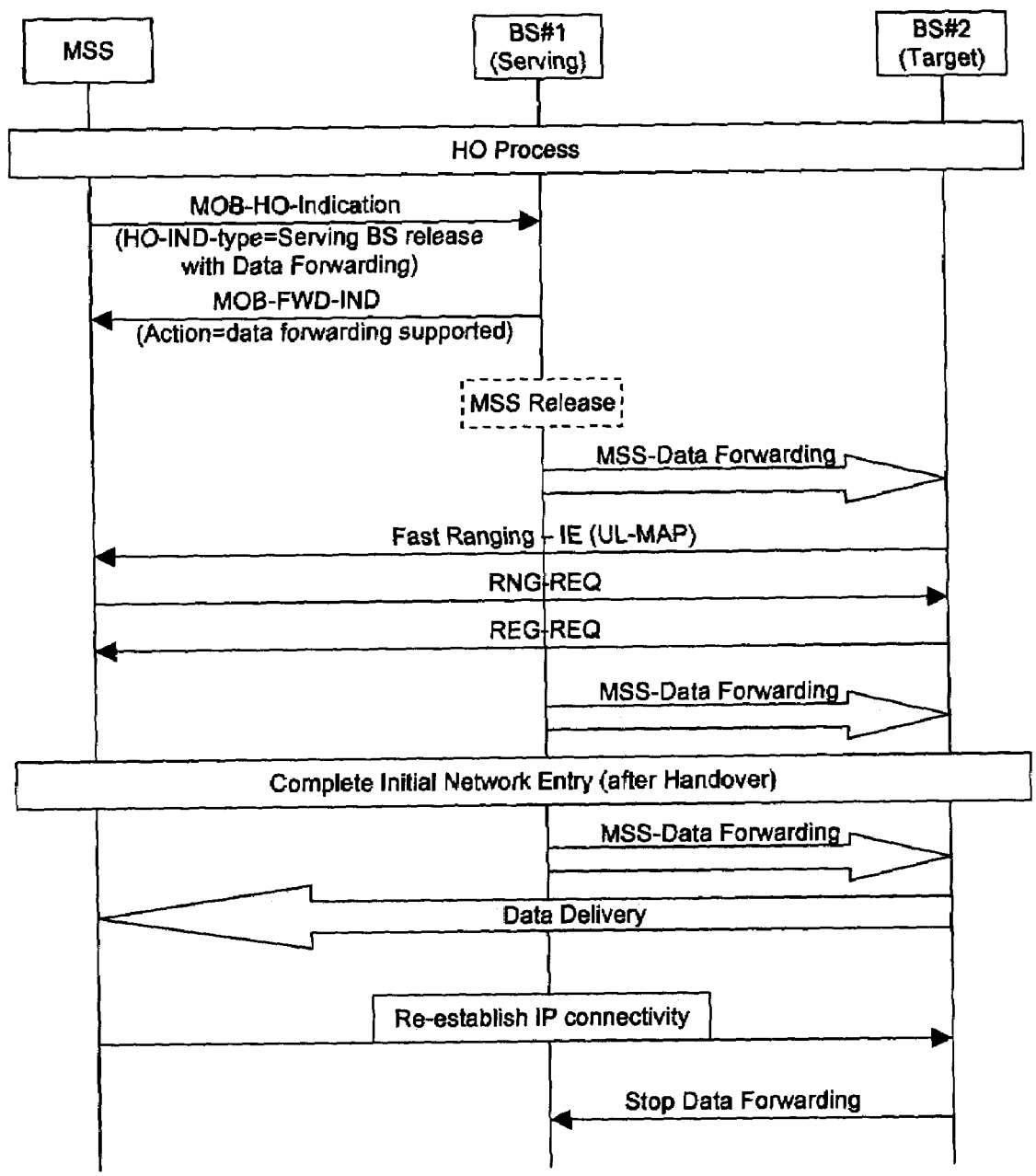
FIG. 14 depicts a method of the second embodiment of the present invention, wherein IP address establishment is performed when the base station can explicitly inform the mobile station about whether or not data delivery is possible.

Also, in FIGS. 12 through 14, it should be noted that the data forwarding steps can continue to be performed until the Serving BS receives a message indicating that data forwarding should be stopped (Stop-Data-Forwarding) from the Target BS.

Figure 2:
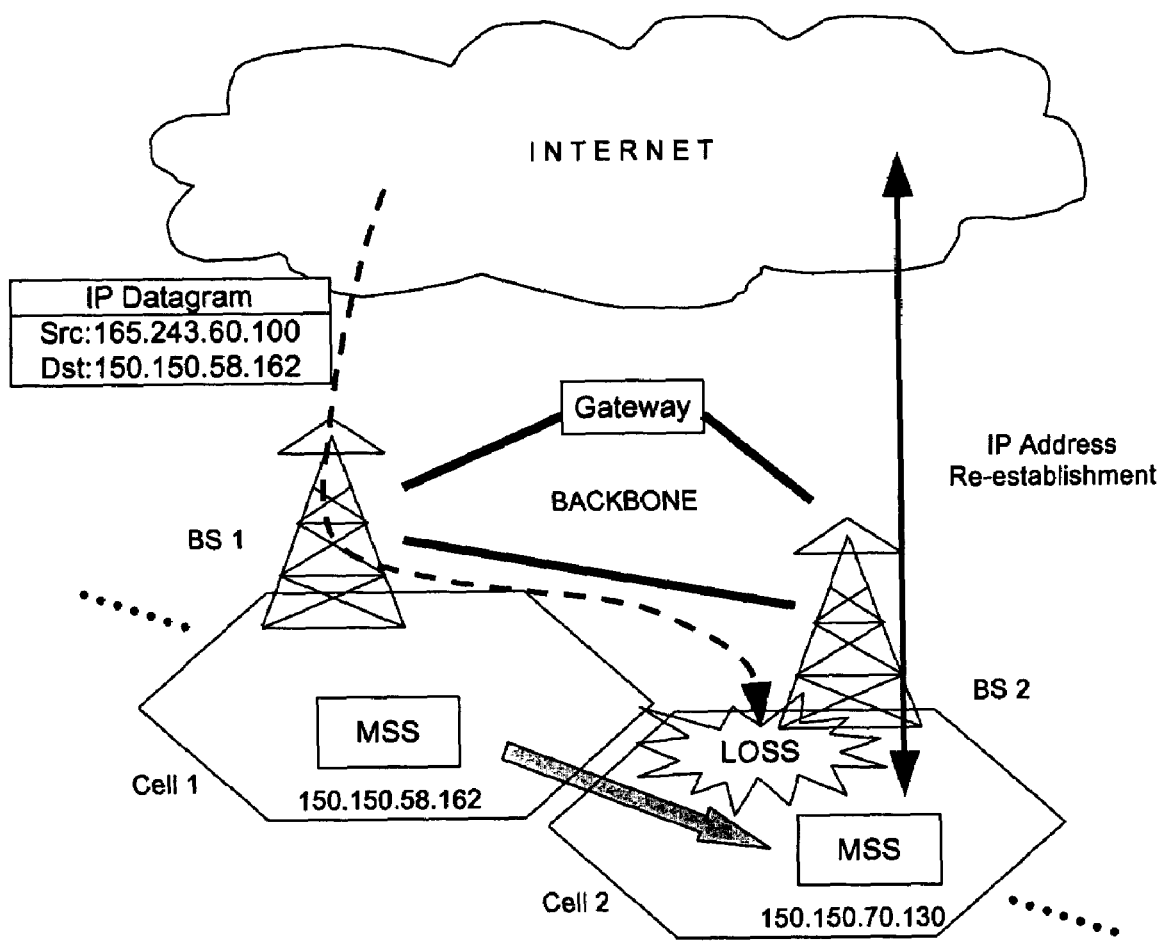
FIG. 2 depicts IP address re-establishment when a mobile station in idle mode changes to receiving mode or when handover occurs according to the related art.
Figure 3:
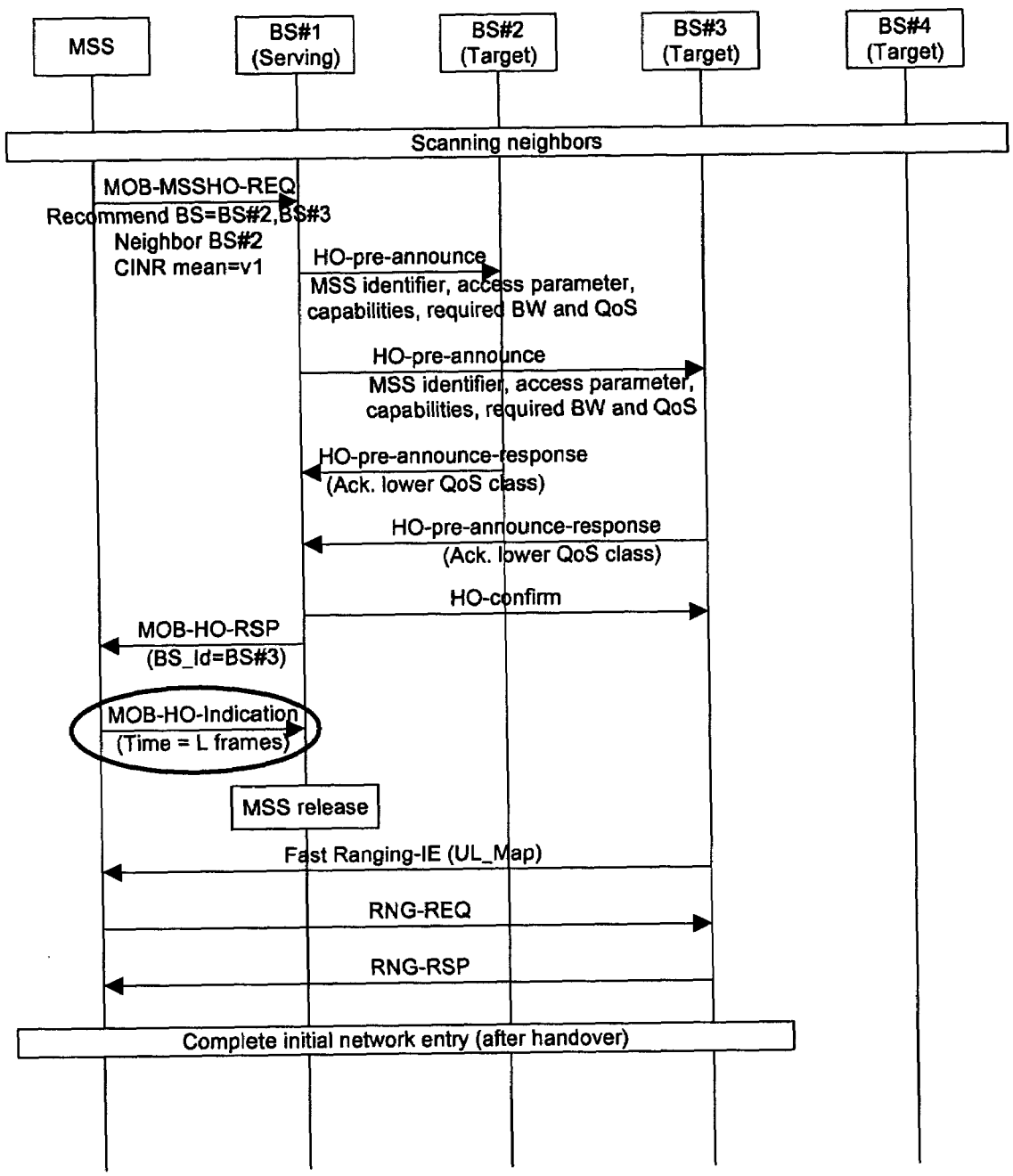
FIG. 3 depicts an example of performing handover upon request from a mobile station.
Figure 4:
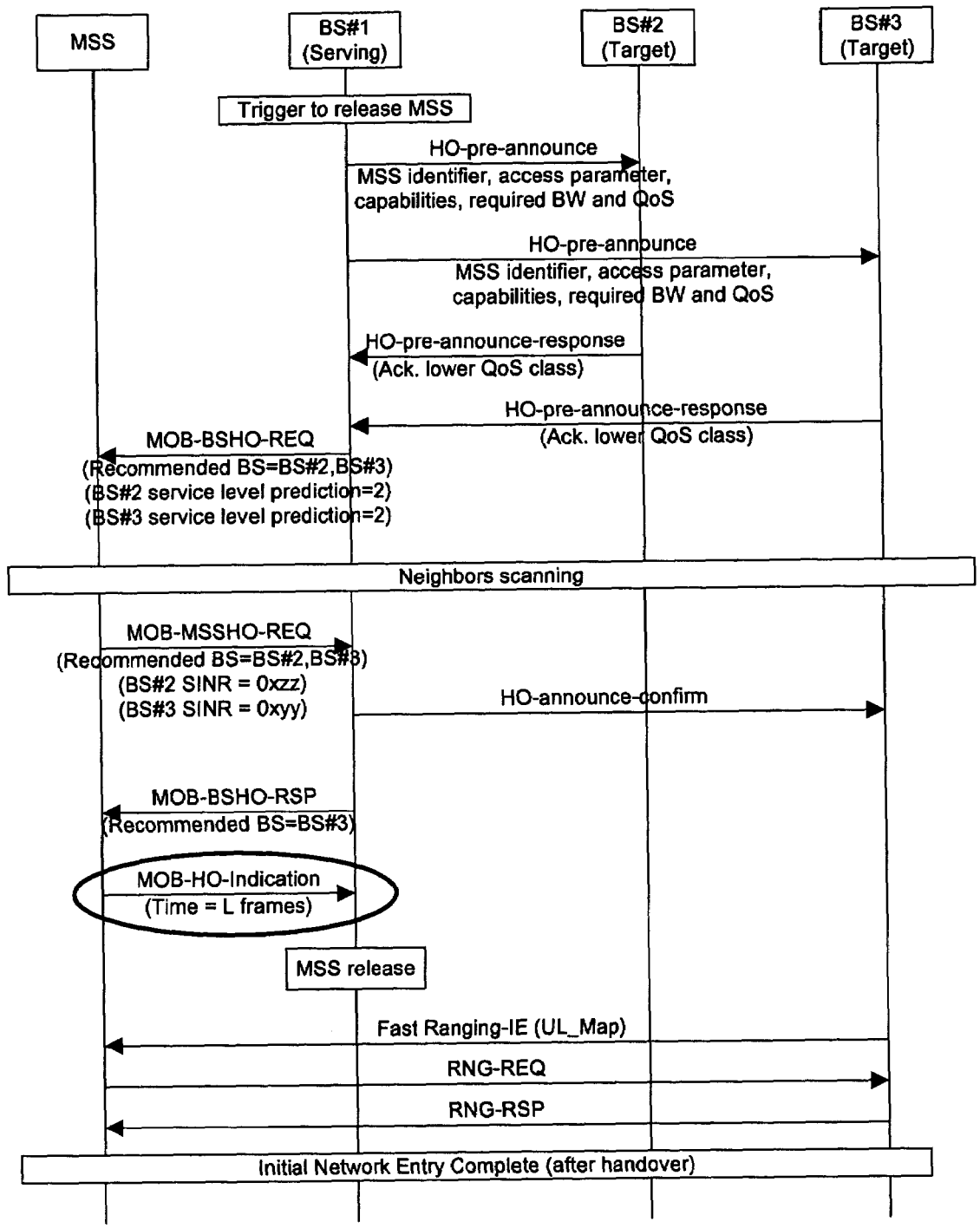
FIG. 4 depicts an example of performing handover upon request from a base station.

Furthermore, as the features of the present invention have been described for delivering (forwarding) data between base stations, it can be understood that such data forwarding (delivery) may be performed directly between base stations or via an intermediary network element, such as an access gateway. In other words, as shown in FIG. 2, a portion of the network (e.g., a backbone) may include at least two base stations directly connected together or at least two base stations connected to each other via a gateway (or other network element).

When Base Station Cannot Explicitly Inform the Terminal about Data Delivery Capability FIG. 12 depicts an IP address establishment when the base station cannot explicitly inform the mobile terminal as to whether or not data delivery is possible.

Referring to FIG. 12, if there is data currently being received, the mobile terminal sets the HO_IND_type of the MOB-HO-IND to '00' (=Serving BS release) and transmits, or sets '11' (=Serving BS release with data forwarding) and can transmit to the base station (BS#1). If the HO_IND_type is '00', the mobile terminal performs handover without expecting to receive an explicit data delivery indicator from the base station.

In this case, the terminal cannot know whether the previous base station (BS#1) can deliver data to the new base station (BS#2). Accordingly, after handover, the mobile terminal re-establishes an IP address after waiting for a certain amount of time to see if there is any data to be delivered from the previous base station (BS#1). If there is data delivered during the certain amount of time, the mobile terminal can put off (delay, defer or postpone) IP address establishment while receiving such data, may stop data reception at any time, decide to receive data through a new path, and when IP re-establishment takes place, the new base station (BS#2) detects this and delivers a data transmission stop message to the previous base station (BS#1).

Upon receiving the above-identified data transmission stop message, the previous base station stops the message that is being transmitted, releases (cancels) the state machine of the MAC with respect to the mobile terminal that moved and thereafter ignores the MAC SDUs delivered from an upper layer.

FIG. 13 depicts an IP address establishment when a base station does not provide an explicit data delivery message.

Referring to FIG. 13, if the mobile terminal transmits the HO_IND_type as '11', this means that the mobile terminal expects that the base station will explicitly inform whether data delivery should be made or not, and if a data delivery indicator is received from the base station, then the mobile station operates in the same manner as when the base station can explicitly inform whether or not data delivery is possible, as shown in FIG. 14.

However, if the base station does not support the data delivery indicator, the mobile station waits for a certain amount of time, and if the data delivery indicator is not received from the base station, the subsequent operations are performed in the same manner as when the HO_IND_type is '00'.

When Base Station can Explicitly Inform the Terminal about Data Delivery Capability FIG. 14 depicts an IP address establishment when the base station can explicitly inform the mobile terminal about whether or not data delivery is possible.

As shown in FIG. 14, when the mobile terminal has data currently being received, the HO_IND_type of the MOB-HO-IND can be transmitted upon being set to '11' (=Serving BS release with Data Forwarding) in order to receive from the base station, an explicit indicator that indicates whether or not data delivery is possible. If the base station (BS#1) supports the HO_IND_type of the handover indicator (MOB-HO-IND), then the base station (BS#1) transmits a data delivery indicator (MOB-FWD-IND) to the mobile station. Accordingly, the mobile station receiving the data delivery indicator (MOB-FWD-IND) performs the IP address re-establishment procedures after receiving the data being currently received.

Figure 15:
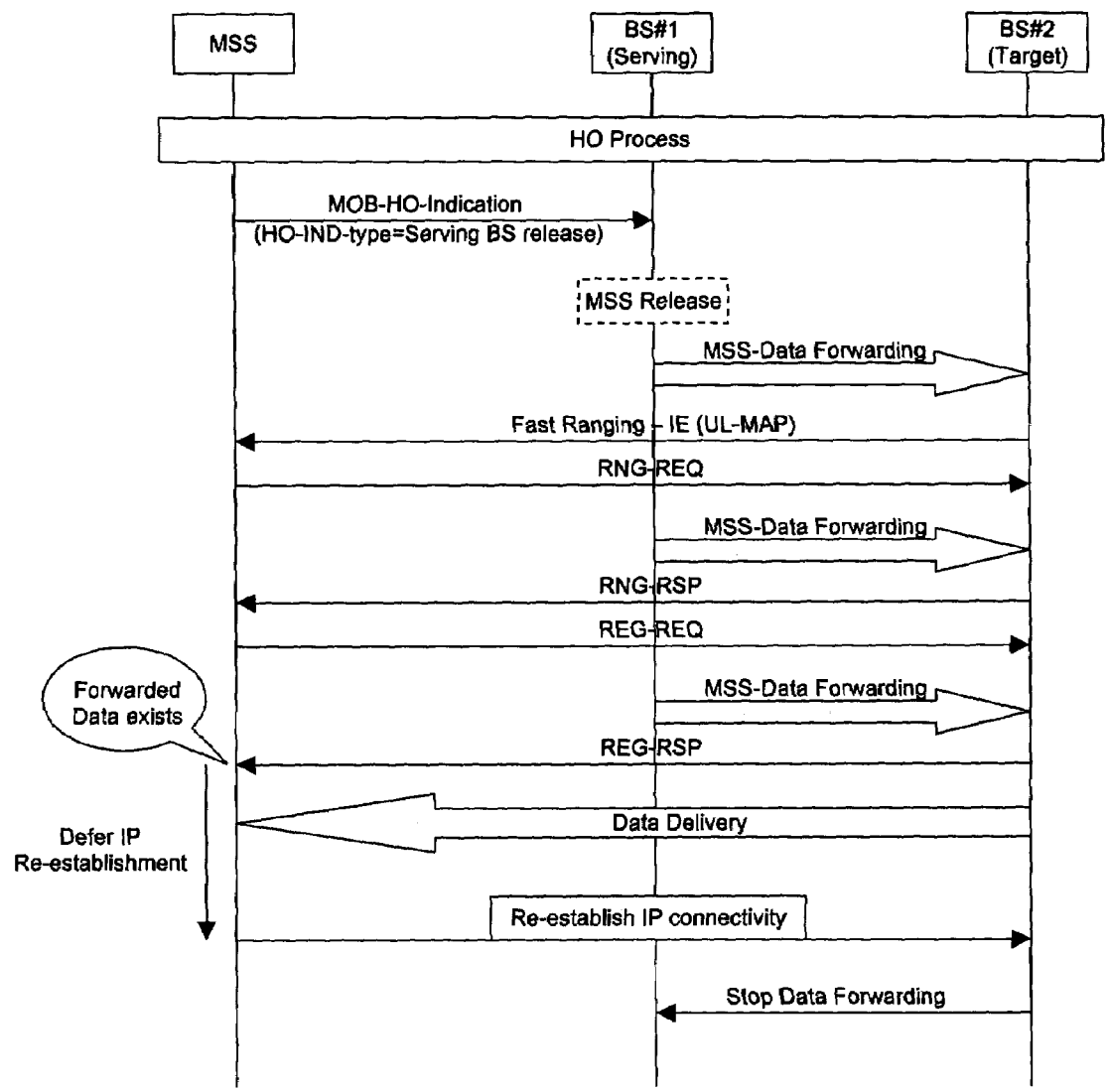
FIG. 15 depicts a method of the second embodiment of the present invention, wherein an example of the procedures for data delivery after the service base station transmits an indicator upon request from the mobile station.

When Informing New Base Station about Whether or Not Data to be Delivered Exists FIG. 15 depicts an example of the procedures for the service base station transmitting an indicator and delivering data according to the request of an explicit indicator of the mobile station.

Referring to FIG. 15, when the mobile station that was receiving data moves, and when the new base station (BS#2) receives from the previous base station (BS#1) delivery data for the terminal to be handed over, the new base station (BS#2) informs this fact to the mobile terminal when performing the ranging procedures after the mobile terminal is handed over or when performing the registration procedures such that the mobile terminal defers IP address establishment.

As described above, when the mobile terminal moves from a first base station zone in which initial idle mode transition was made into a second base station zone and attempts to receive data, the present invention defines the procedures for delivering the received data from the first base station to the second base station, and defines a method for the mobile terminal to defer the IP address establishment procedures in order to receive the above-identified data, in order to achieve the effect of efficiently performing data delivery.

Also, the present invention has the effect of providing the mobile terminal with a method of delivering data between base stations after handover, and by delaying IP address re-establishment when the mobile terminal receives the data that was delivered from the previous base station to the new base station, such that service continuity can be guaranteed.

As the present invention has been described above with respect to wireless access technologies, it can be clearly understood that various wireless access technologies currently under development (such as WiMax, WiBro, Wi-Fi, etc.) can also benefit from the features and teachings of the present invention, which are applicable because of the similarities involved in wireless communications involving user terminal mobility, handovers and idle mode operations.

The foregoing description of the preferred embodiments is provided to enable any person skilled in the art to make or use the present invention. Various modifications to these embodiments will be readily apparent to those skilled in the art, and the generic principles defined herein may be applied to other embodiments. Thus, the present invention is not intended to be limited to the embodiments shown herein but us to be accorded the widest scope consistent with the principles and novel features disclosed herein.

What is claimed is:

1. A method of handover for broadband wireless access systems, the method comprising:
   determining that handover for a mobile station is necessary while a session connection exists between end users;
   notifying from a first point of attachment to a second point of attachment that the session is to be maintained by the second point of attachment after handover;
   performing handover procedures by a mobile station to associate with the second point of attachment;
   informing from the second point of attachment to the mobile station that a mobile station downlink data pending element exists; and
   delaying Internet Protocol addressing after receiving the downlink data pending element, if the Internet Protocol addressing needs to be changed.

2. The method of claim 1, wherein the determining step is performed by the mobile station or by a network entity.

3. The method of claim 1, the informing step is omitted if the mobile station has a timer that is appropriately set to allow the mobile station to wait and receive any downlink data to be forwarded by the second point of attachment.

4. The method of claim 1, wherein the delaying step is performed by the mobile station.

5. The method of claim 1, further comprises the steps of:
   performing new Internet Protocol addressing or re-establishing an Internet Protocol address by the mobile station; and
   instructing by the first point of attachment to the second point of attachment to terminate its resources for forwarding data.

6. The method of claim 1, wherein the mobile station associating with the second point of attachment refers to network entry or re-entry by the mobile station.

7. The method of claim 1, wherein the handover procedures includes ranging and registration.

8. The method of claim 1, wherein the session includes data forwarding by the second point of attachment to the mobile station.

9. The method of claim 1, wherein the point of attachment is a base station, a router, or another type of access point.

10. The method of claim 9, wherein the first point of attachment is a previously serving base station and the second point of attachment is a newly serving base station.

11. The method of claim 1, wherein the procedures are performed within one broadband wireless access system.

12. The method of claim 1, wherein the procedures are performed between multiple broadband wireless access systems.

13. The method of claim 12, wherein the multiple broadband wireless access systems comprise an IEEE network and a cellular network.

14. A method of handover for broadband wireless access systems, the method comprising:
   determining that handover is necessary while a session connection exists between end users;

informing by a mobile station to a new point of attachment, to perform old point of attachment release with data forwarding indication;

notifying from an old point of attachment to the new point of attachment that the session is to be maintained by the new point of attachment after handover;

performing handover procedures by the mobile station to associate with the new point of attachment;

informing from the new point of attachment to the mobile station, that a mobile station downlink data pending element exists; and delaying Internet Protocol addressing after receiving the downlink data pending element, if Internet Protocol addressing needs to be changed.

15. The method of claim 14, further comprises, prior to the notifying step, a step of informing by the old point of attachment as to whether the data forwarding can be supported therefrom.

16. The method of claim 14, wherein the determining step is performed by the mobile station or by a network entity.

17. The method of claim 14, the informing step is omitted if the mobile station has a timer that is appropriately set to allow the mobile station to wait and receive any downlink data to be forwarded by the second point of attachment.

18. The method of claim 14, wherein the delaying step is performed by the mobile station.

19. The method of claim 14, further comprises the steps of:
performing new Internet Protocol addressing or re-establishing an Internet Protocol address by the mobile station; and
instructing by the first point of attachment to the second point of attachment to terminate its resources for forwarding data.

20. The method of claim 14, wherein the mobile station associating with the second point of attachment refers to network entry or re-entry by the mobile station.

21. The method of claim 14, wherein the handover procedures includes ranging and registration.

22. The method of claim 14, wherein the session includes data forwarding by the second point of attachment to the mobile station.

23. The method of claim 14, wherein the point of attachment is a base station, a router, or another type of access point.

24. The method of claim 23, wherein the first point of attachment is a previously serving base station and the second point of attachment is a newly serving base station.

25. The method of claim 14, wherein the procedures are performed within one broadband wireless access system.

26. The method of claim 14, wherein the procedures are performed between multiple broadband wireless access systems.

27. The method of claim 26, wherein the multiple broadband wireless access systems comprise an IEEE network and a cellular network.

28. A method of maintaining data reception during mobility in broadband wireless access systems, the method comprising:
performing handover with a first base station and a second base station, while receiving downlink data from the first base station;
receiving an indication that the second base station will forward additional downlink data related to the downlink data previously received from the first base station;
delaying Internet Protocol address establishment until the additional downlink data is received; and
receiving the additional downlink data from the second base station.

29. The method of claim 28, further comprises, after receiving the additional downlink data, a step of re-establishing Internet Protocol connectivity upon Internet Protocol address establishment.

30. A method of maintaining data transmissions during mobility in broadband wireless access systems, the method comprising:
performing handover for a mobile station with a first base station and a second base station, while sending downlink data from the first base station to the mobile station;
sending an indication to the mobile station that the second base station will forward additional downlink data related to the downlink data previously sent from the first base station; and
sending the additional downlink data from the second base station to the mobile station which delayed Internet Protocol address establishment until the additional downlink data is completely received.

31. The method of claim 30, further comprises, after sending the additional downlink data, a step of cooperating with the mobile station for re-establishing Internet Protocol connectivity upon Internet Protocol address establishment.

* * * * *